2 Sheets--Sheet 1.

O. P. DRAKE.

Improvement in Apparatus for Carbureting Air and Gas.

No. 131,815.  Patented Oct. 1, 1872.

Witnesses:
George E. Phelps
E. E. Torrey

Inventor:
Oliver P. Drake
by Van Andrew his attorney

O. P. DRAKE.
Improvement in Apparatus for Carbureting Air and Gas.
No. 131,815. Patented Oct. 1, 1872.
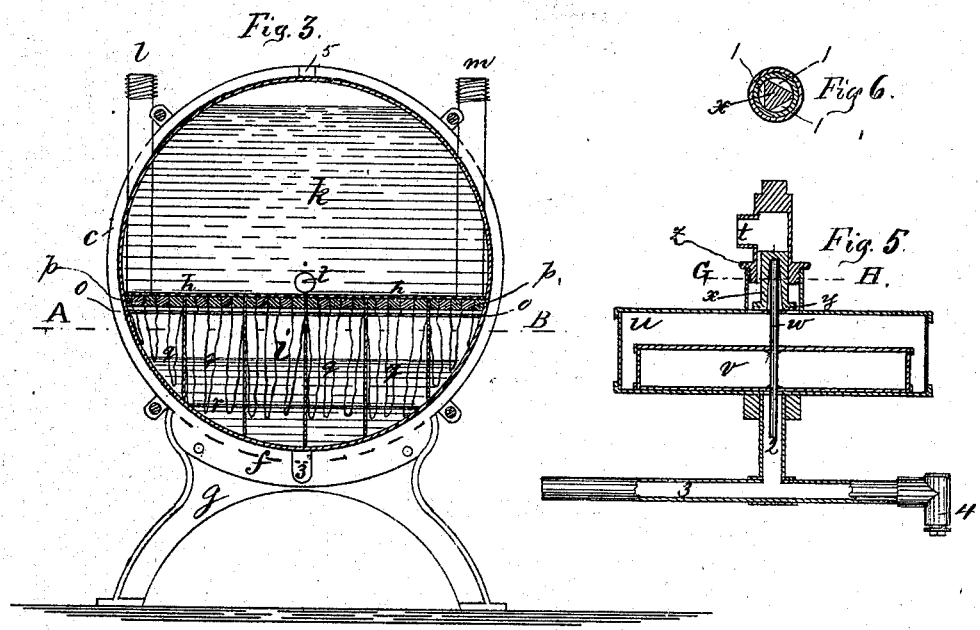
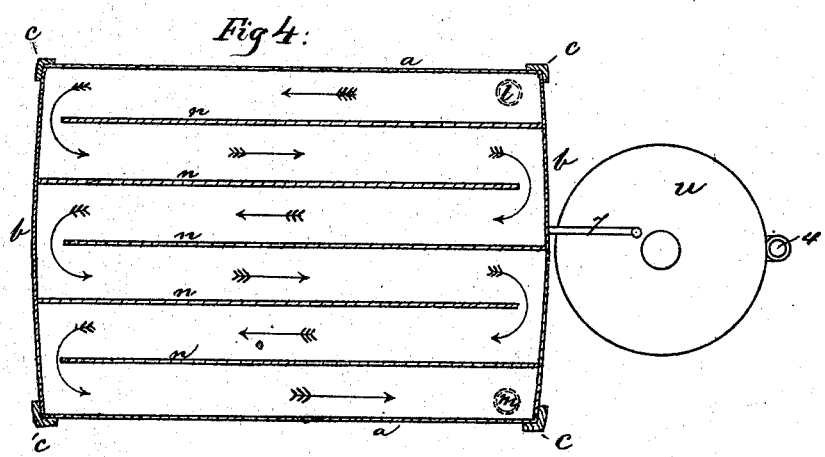
Witnesses:
George E. Phelps
E. E. Torrey
Inventor:
Oliver P. Drake
by Avan Andrin his attorney

UNITED STATES PATENT OFFICE.

OLIVER P. DRAKE, OF BOSTON, MASSACHUSETTS.

IMPROVEMENT IN APPARATUS FOR CARBURETING AIR AND GAS.

Specification forming part of Letters Patent No. 131,815, dated October 1, 1872.

*To all whom it may concern:*

Be it known that I, OLIVER P. DRAKE, of Boston, in the county of Suffolk and State of Massachusetts, have invented certain new and useful Improvements in Gas-Generators, of which the following is a specification:

Nature and Objects of the Invention.

The nature of my invention relates to improvements in gas-generators, consisting in the arrangement of the tank or receiver and the generator, both of which are contained in one and the same cylindrical case in such a manner that the tank or receiver for the gasoline is made in the upper part of the cylindrical case, and the generator is made in the lower part of the same. An automatic regulating apparatus stands in open communication with the tank and generator, and regulates the height of the gasoline in the generator, so that it will always remain of a standard height in the said generator.

Figure 1:
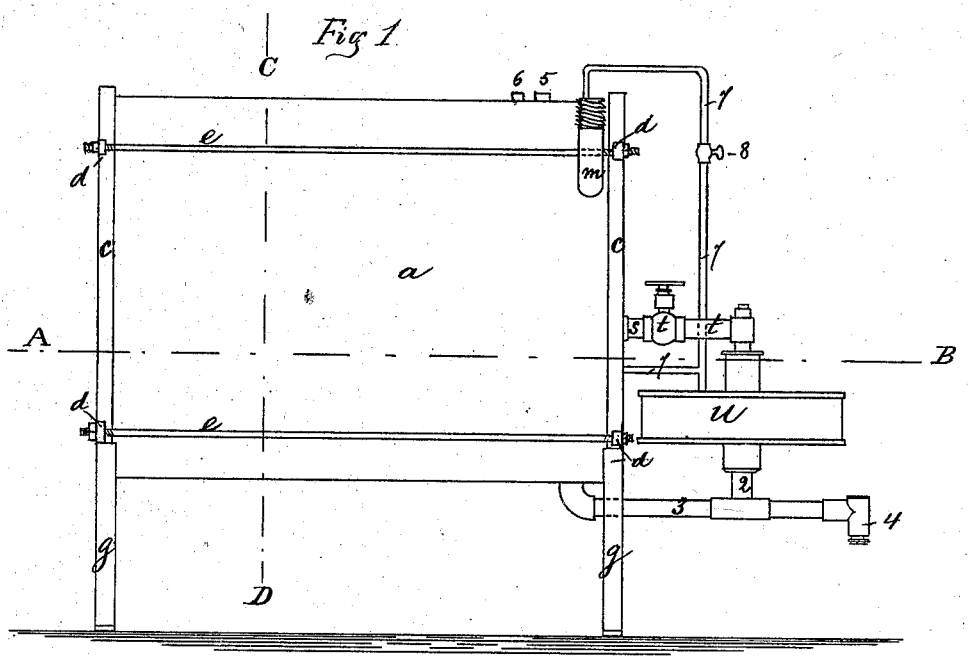
Figure 2:
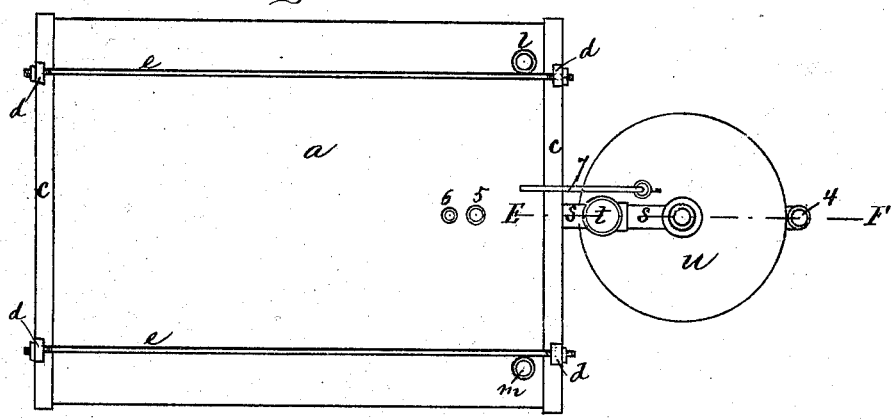

In the drawing, Figure 1 is a side elevation of my combined tank and generator; Fig. 2 is a ground plan; Fig. 3 is a cross-section over the line C D taken on Fig. 1; Fig. 4 is a horizontal section taken over the line A B on Figs. 1 and 3; Fig. 5 is an enlarged central longitudinal section over the line E F taken on Fig. 2; and Fig. 6 is a cross-section over the line G H.

Similar letters refer to similar parts wherever they occur in the drawing.

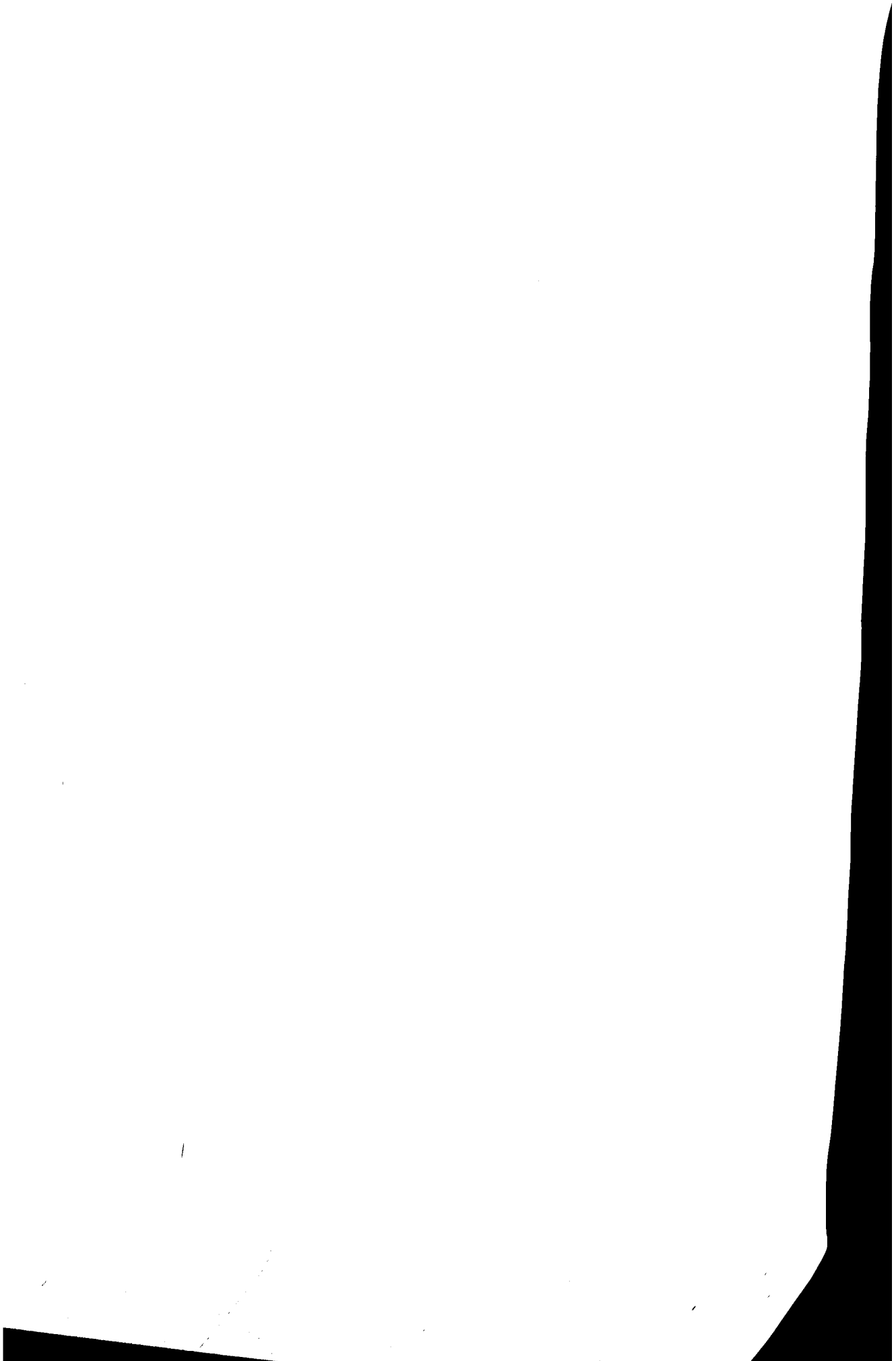

$a\ a$ is a cylindrical metallic case, to which are soldered the ends $b\ b$, as shown in Figs. 1 and 4. The case $a\ a$ is supported in each end by means of an angular ring, $c\ c$, provided with a number of ears, $d\ d$, through which the stay-bolts $e\ e$ pass. The stay-bolts $e\ e$ are provided with suitable nuts on their extreme ends, by which arrangement the frames or rings $c\ c$ are firmly held to the case $a$, and the case $a$ strengthened very materially. The rings $c\ c$ are each provided with a flange, $f\ f$, on the under side, that is attached to a portable support, $g\ g$, on which the case $a$ is supported. The supports $g\ g$ may be detached from the case $a$ during transportation from one place to another, by which the whole may be packed in a comparatively small space. The case $a$ is divided by means of the wall $h$ into two compartments, $i$ and $k$, as shown in Fig. 3. $i$ is the gas-generator, and $k$ is the tank or receiver where the gasoline is stored. Two pipes, $l\ m$, project through the case $a$ and wall $h$, and communicate with the generator $i$. The air from any suitable air-forcing apparatus is forced in through the pipe $l$ into the gas-generator $i$, and the gas exhausts through the delivery-pipe $m$, as shown on Fig. 4. The generator $i$ is divided by means of the division-walls $n\ n\ n$ into a number of compartments, in a manner, as shown on Fig. 4, whereby the air that is forced in through the pipe $l$ is conducted over the gasoline in the generator $i$, in a manner as fully indicated by the arrows on the said Fig. 4. By this arrangement the air remains long in contact with the gasoline, and gets thoroughly charged with the gasoline vapor before it is drawn off through the pipe $m$; but for the purpose of still more increasing the evaporating surface of the gasoline, I attach to the under side of the wall $h$, or suspend on suitable rods $o\ o$ a number of wooden slats, $p\ p\ p$, from which are suspended into the gasoline a number of cloths, $q\ q\ q\ q$, up in which the gasoline is drawn by its capillary attraction, whereby a very great surface is exposed to the air as it passes through the generator. The cloths $q\ q\ q$ are held in place at their lower ends by means of the rods $r$, or their equivalents, as shown. From the tank $k$ leads a pipe, $s$, provided with a stop-valve, $t$, to the automatic feed-regulator $u$, as shown. This regulator consists in a cylindrical box, $u$, in which is movable a hollow float, $v$, provided on its upper side with a vertical rod, $w$, on the upper end of which is hung loosely the valve $x$. Said valve is provided with a round collar, $y$, in its lower end that will rest against the under side of the cap $z$, when the float $v$ is raised by the liquid to its highest position. The body of the valve $x$ is made triangular, or of a similar shape as shown in Fig. 6, so as to leave channels 1 1 1 on its surface for the liquid to pass through from the pipe $t$ leading from the tank $k$. In the bottom of the box $u$ is made an opening, and the pipe 2 fitted therein in a suitable manner. The pipe 2 is connected to the horizontal pipe 3 that leads into the lower part of the generator $i$, as shown in Figs. 1 and 5. In the extreme outer end of the pipe 3 is fitted a suitable stop-